(12) United States Patent
Hévizi et al.

(10) Patent No.: US 12,659,771 B2
(45) Date of Patent: Jun. 16, 2026

(54) TRAJECTORY BASED PERFORMANCE MONITORING IN A WIRELESS COMMUNICATION NETWORK

(71) Applicant: Telefonaktiebolaget LM Ericsson (publ), Stockholm (SE)

(72) Inventors: László Hévizi, Piliscsaba (HU); Attila Báder, Paty (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 476 days.

(21) Appl. No.: 18/016,793

(22) PCT Filed: Jul. 24, 2020

(86) PCT No.: PCT/EP2020/071002
§ 371 (c)(1),
(2) Date: Jan. 18, 2023

(87) PCT Pub. No.: WO2022/017626
PCT Pub. Date: Jan. 27, 2022

(65) Prior Publication Data
US 2023/0292156 A1    Sep. 14, 2023

(51) Int. Cl.
*H04W 64/00* (2009.01)
*H04B 17/318* (2015.01)
*H04W 24/08* (2009.01)

(52) U.S. Cl.
CPC .......... *H04W 24/08* (2013.01); *H04B 17/318* (2015.01); *H04W 64/006* (2013.01)

(58) Field of Classification Search
None
See application file for complete search history.

(56) References Cited

U.S. PATENT DOCUMENTS

2014/0036656 A1* 2/2014 Chou ................... H04W 24/04
                                                              370/216
2018/0270126 A1    9/2018 Tapia
2019/0116485 A1    4/2019 Vasseur et al.

FOREIGN PATENT DOCUMENTS

EP          2880890 A1    6/2015
WO    2014022038 A1    2/2014

OTHER PUBLICATIONS

International Search Report and Written Opinion of the International Searching Authority for PCT International Application No. PCT/EP2020/071002 dated Apr. 1, 2021.

(Continued)

*Primary Examiner* — Suhail Khan
(74) *Attorney, Agent, or Firm* — Sage Patent Group

(57) ABSTRACT

For each of a plurality of wireless devices, signal strength measurements performed by the wireless device are collected. The signal strength measurements are collected with respect to a plurality of cells of the wireless communication network. Further, based on the signal strength measurements, a plurality of zones of the wireless communication network is determined. Each zone indicates a position of the wireless device with respect to the cells when performing a respective one of the signal strength measurements. Further, for each of the wireless devices, a respective trajectory is determined from a sequence of the zones passed by the wireless device. Further, performance data related to the wireless devices are collected, and the performance data are filtered based on the trajectories.

20 Claims, 12 Drawing Sheets

(56) References Cited

OTHER PUBLICATIONS

3GPP TS 37.320 V16.0.0, "3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)," Mar. 2020, 34 pages.

3GPP TS 36.331 V16.0.0, "3rd Generation Partnership Project; Technical Specification Group Radio Access Network; Evolved Universal Terrestrial Radio Access (E-UTRA); Radio Resource Control (RRC); Protocol specification (Release 16)," Mar. 2020, 1048 pages.

Gacanin et al., "Artificial Intelligence Paradigm for Customer Experience Management in Next-Generation Networks: Challenges and Perspectives," IEEE Network, Mar./Apr. 2019, vol. 33, No. 2, pp. 188-194.

Ericsson, "Expert Analytics," https://www.ericsson.com/en/portfolio/cloud-software--services/automated-network-operations/analytics-and-assurance/expert-analytics, 2022, 3 pages.

* cited by examiner

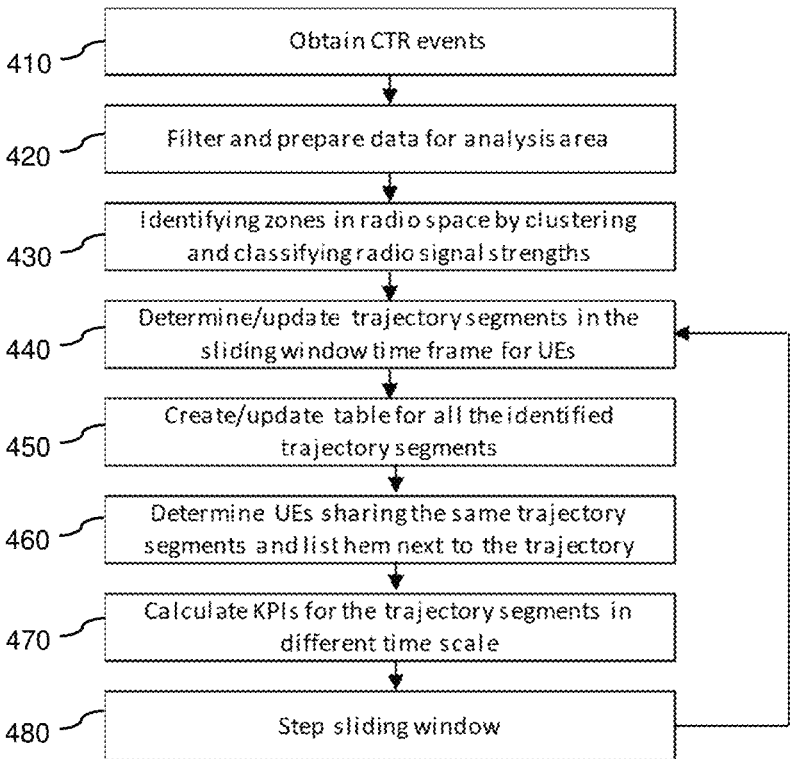

410 — Obtain CTR events

420 — Filter and prepare data for analysis area

430 — Identifying zones in radio space by clustering and classifying radio signal strengths 440 — Determine/update trajectory segments in the sliding window time frame for UEs 450 — Create/update table for all the identified trajectory segments 460 — Determine UEs sharing the same trajectory segments and list them next to the trajectory 470 — Calculate KPIs for the trajectory segments in different time scale 480 — Step sliding window

FIG. 4

| ... | | |
|---|---|---|
| $z_3$, $z_{20}$, $z_9$, $z_{22}$, $z_{21}$ | +1 | $UE_7$, $UE_{13}$, ... |
| $z_4$, $z_3$, $z_{20}$, $z_9$, $z_{22}$ | | $UE_7$, $UE_{13}$, ... |
| $z_{12}$, $z_4$, $z_3$, $z_{20}$, $z_9$ | | $UE_7$, $UE_{19}$, ... |
| $z_{12}$, $z_{12}$, $z_4$, $z_3$, $z_{20}$ | | $UE_7$, $UE_{19}$, ... |
| ... | | ... |
| ... | | ... |

1110 — Collect signal strength measurements

1120 — Determine zones

1130 — Determine trajectories

1140 — Determine trajectory segments

1150 — Collect performance data

1160 — Filter performance data

1170 — Analyze performance

TRAJECTORY BASED PERFORMANCE MONITORING IN A WIRELESS COMMUNICATION NETWORK

CROSS-REFERENCE TO RELATED APPLICATION

This application is a 35 U.S.C. § 371 national stage application of PCT International Application No. PCT/EP2020/071002 filed Jul. 24, 2020, the contents of which are hereby incorporated by reference herein.

TECHNICAL FIELD

The present invention relates to methods for monitoring performance in a wireless communication network and to corresponding devices, systems, and computer programs.

BACKGROUND

In wireless communication networks, e.g., as specified by 3GPP ($3^{rd}$ Generation Partnership Project), it is known to use so called subscriber and network analytics or Customer Experience Management (CEM) systems for monitoring and analyzing service and network quality. Such analytics are typically performed on a per subscriber level. CEM systems are for example used in Network Operation Centers (NOCs), Service Operation Centers (SOCs), or for network optimization engineering and network performance management. Such analytics may for example involve monitoring the network to compute end-to-end service quality metrics and user level end-to-end key performance indicators (KPIs). Such types of analytic solutions are typically used for session-based troubleshooting, network analysis and optimization.

In NOCs, basic network KPIs may be monitored in a continuous real-time fashion. The KPIs may be based on various types of events and counters. The KPIs may be aggregated in time, and some further KPIs may be derived for certain network nodes or other dimensions, e.g., KPIs related to a certain device type, service provider, or the like. The KPIs can indicate node or network failures. However, in some situations the KPIs may fail to provide sufficient information for troubleshooting, e.g., because they are not suitable for identifying end-to-end, user-perceived service quality issues. In some cases, troubleshooting may require thorough investigation of detailed network logs, in particular logs which are collected from different network nodes or from different network domains.

Event-based subscriber analytics or CEM systems may also be used in SOCs in order to monitor network-level quality of a wide variety of services, as well as to monitor customer experience on an individual, per-subscriber level. These tools may for example be used to support customer care. Event-based analytics typically use real-time data collection and correlation of characteristic node and protocol events from different radio access network (RAN) and core network (CN) nodes. The event-based analytics may also probe signaling interfaces and sample user-plane data traffic.

With the introduction of 5G ($5^{th}$ Generation) wireless communication networks, it is expected that the wireless communication networks will provide a large variety of new service types with quality of service and quality of experience assurance, and that the wireless communication networks will serve a much higher number of user equipments (UEs). Further, the number of cells in of the wireless communication network is expected to grow. This results in an increased number of events and other information that needs to be processed by an analytics system.

In many cases, service quality has a significant dependency on quality of radio links. Existing analytics systems may aggregate radio link performance metrics at cell level. Accordingly, the low-level KPIs and incidents are associated with cells, sometimes with transceivers or antennas. In such cases, it is however difficult to perform an analysis with respect to individual UEs. As a result, analytics based on cell-level data may be useful when monitoring network and service KPIs, but may in some cases not allow for sufficiently detailed troubleshooting and radio network optimization. For example, KPIs derived from data aggregated on a cell-level may hide issues related to small coverage holes or other spatial radio-link problems. Further, it is difficult or impossible to separate service quality degradations due to different radio root causes within a cell. Still further, root-cause indication of incidents may be not sufficiently reliable.

A possible solution to address the above shortcomings would be to obtain more exact location information, e.g., by using mobility drive tests (MDT), or to obtain coordinates from mobile positioning system (MPS). However, MDTs are typically very costly to conduct and are typically limited to the most frequently used locations. Further, simultaneous tracking of a large user population by MPS is computationally and hardware-wise very demanding. Further, although currently many UEs are provided with a built-in satellite positioning system, which could provide outdoor geographical location, collecting satellite positioning reports from UEs also raises privacy issues and power efficiency issues. Further, such reporting would need to be supported by the network operators.

A further issue is that cell-based data aggregation may be too coarse to track moving subscribers because the cell-level KPIs and service degradations cannot be properly correlated with local radio coverage problems. This may happen even for short data sessions. This may be illustrated by assuming the following scenario: In a session, a first UE, which is static, experiences low throughput while the average RSRP (Reference Signal Received Power) measured for the session is −120 dBm. In this case, it can be easily concluded that the reason of service degradation is bad coverage. If a second UE moves over the same location while watching video, and the second UE experiences a video stall while passing over the coverage hole, the average RSRP measured over the same time interval may be −100 dBm, which is higher than for the static UE and typically considered as normal. Accordingly, for the second UE monitoring the RSRP during the video session may not be sufficient to enable a proper analysis, i.e., to identify the underlying coverage problem.

Accordingly, there is a need for techniques which allow for efficiently monitoring performance in a wireless communication network.

SUMMARY

According to an embodiment, a method of monitoring a wireless communication network is provided. The method comprises, for each of a plurality of wireless devices, collecting signal strength measurements performed by the wireless device with respect to a plurality of cells of the wireless communication network. Further, the method comprises, based on the signal strength measurements, determining a plurality of zones of the wireless communication network, each zone indicating a position of the wireless device with respect to the cells when performing a respective one of the signal strength measurements. Further, the method comprises, for each of the wireless devices, determining a respective trajectory from a sequence of the zones passed by the wireless device. Further, the method comprises collecting performance data related to the wireless devices. Further, the method comprises filtering the performance data based on the trajectories.

According to a further embodiment, a node for a wireless communication network is provided. The node is configured to, for each of a plurality of wireless devices, collect signal strength measurements performed by the wireless device with respect to a plurality of cells of the wireless communication network. Further, the node is configured to, based on the signal strength measurements, determine a plurality of zones of the wireless communication network, each zone indicating a position of the wireless device with respect to the cells when performing a respective one of the signal strength measurements. Further, the node is configured to, for each of the wireless devices, determine a respective trajectory from a sequence of the zones passed by the wireless device. Further, the node is configured to collect performance data related to the wireless devices. Further, the node is configured to filter the performance data based on the trajectories.

According to a further embodiment, a node for a wireless communication network is provided. The node comprises at least one processor and a memory. The memory contains instructions executable by said at least one processor, whereby the node is operative to, for each of a plurality of wireless devices, collect signal strength measurements performed by the wireless device with respect to a plurality of cells of the wireless communication network. Further, the memory contains instructions executable by said at least one processor, whereby the node is operative to, based on the signal strength measurements, determine a plurality of zones of the wireless communication network, each zone indicating a position of the wireless device with respect to the cells when performing a respective one of the signal strength measurements. Further, the memory contains instructions executable by said at least one processor, whereby the node is operative to, for each of the wireless devices, determine a respective trajectory from a sequence of the zones passed by the wireless device. Further, the memory contains instructions executable by said at least one processor, whereby the node is operative to collect performance related to the wireless devices. Further, the memory contains instructions executable by said at least one processor, whereby the node is operative to filter the performance data based on the trajectories.

According to a further embodiment of the invention, a computer program or computer program product is provided, e.g., in the form of a non-transitory storage medium, which comprises program code to be executed by at least one processor of a node for a wireless communication network. Execution of the program code causes the node to for each of a plurality of wireless devices, collect signal strength measurements performed by the wireless device with respect to a plurality of cells of the wireless communication network. Further, execution of the program code causes the node to, based on the signal strength measurements, determine a plurality of zones of the wireless communication network, each zone indicating a position of the wireless device with respect to the cells when performing a respective one of the signal strength measurements. Further, execution of the program code causes the node to, for each of the wireless devices, determine a respective trajectory from a sequence of the zones passed by the wireless device.

Further, execution of the program code causes the node to collect performance data related to the wireless devices. Further, execution of the program code causes the node to filter the performance data based on the trajectories.

Details of such embodiments and further embodiments will be apparent from the following detailed description of embodiments.

BRIEF DESCRIPTION OF THE DRAWINGS

FIG. 4 shows an example of processes performed in the analytics system according to an embodiment of the invention.

DETAILED DESCRIPTION OF EMBODIMENTS

Figure 1:
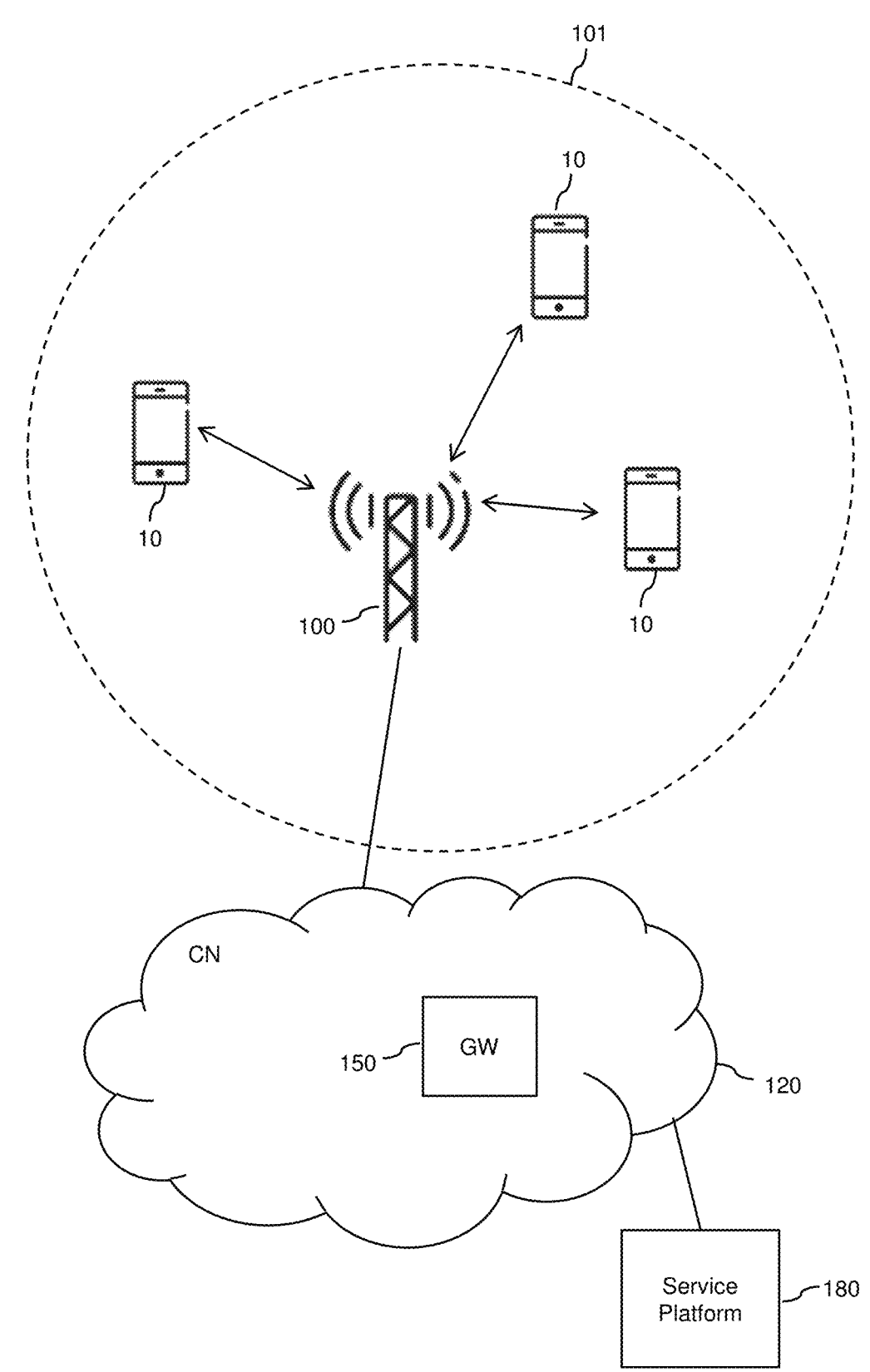
FIG. 1 schematically illustrates an exemplary wireless communication network according to an embodiment of the invention.

In the following, concepts in accordance with exemplary embodiments of the invention will be explained in more detail and with reference to the accompanying drawings. The illustrated embodiments relate to monitoring performance in a wireless communication network. The wireless communication network may be based on various technologies. In some of the following, utilization of the 5G NR technology is assumed. Nonetheless it is to be understood the illustrated concepts could also be additionally or alternatively applied in connection with other technologies, e.g., in a wireless communication network based on the LTE radio technology, or a wireless communication network based on a combination of the 5G NR technology and the 4G LTE technology.

The illustrated concepts aim at efficiently monitoring performance data, in particular with respect to moving wireless devices. Further, the illustrated concepts may enable analytics on a sub-cell level. In the following description, the wireless devices are assumed to be UEs supporting a 3GPP technology, e.g., the NR technology or the LTE technology. However, it is noted that the illustrated concepts could also be applied in connection with other kinds of wireless devices and other technologies.

In the illustrated concepts, an analytics system uses signal strength measurements performed by UEs with respect to cells of the wireless communication network. These signal strength measurements typically relate to a serving cell of the UE and to one or more neighboring cells of the serving cell. The signal strength measurements may for example provide an RSRP (Reference Signal Received Power), RSRQ (Reference Signal Received Quality), or RSSI (Received Signal Strength Indicator) for each cell of a cell region. The cell region may for example include 70 to 80 cells. The signal strength measurements are reported from the UEs to the network, e.g., in connection with events related to handovers or similar events. This reporting may be based on RRC (Radio Resource Control) signaling. In typical scenarios, each UE will provide a report of the signal strength measurements in intervals of 2 to 30 s, typically about 10 s. However, it is noted that this reporting frequency may increase with movements of the UE or decrease if the UE is static.

The signal strength measurements reported by the UEs are used for determining a position of the UE with respect to the cells. This position may be defined in terms of coordinates in a radio space, where each radio space coordinate is based by the signal strength, e.g., RSRP, RSRQ, or RSSI measured with respect to one of the cells. In some scenarios, the measured signal strengths may be used directly as radio space coordinates. In other scenarios, weights may be assigned to the signal strength measurements, and the radio space coordinates may be based on the weighted signal strength measurements. For example, the serving cell of the UE could be assigned a higher weight than the other cells. Accordingly, based on the signal strength measurements, the network may track the position in radio space for each active UE. In particular, the network may determine zones corresponding to the tracked positions. The zones may be determined from the signal strength measurements by using a clustering technique. The analytics system may then associate UE-related performance data, e.g., based on various measurements or reported events, with the zones, in particular with trajectories of the UEs and trajectory segments. Here, a trajectory is defined as a sequences of the zones passed by a UE during a monitoring interval. The trajectory segments are defined by a sequence of time windows within the monitoring time interval, with the zones passed during one of the time windows defining a corresponding trajectory segment. Accordingly, by aggregating the performance data based on the zones, trajectories, and/or trajectory segments, location dependent analytics can be performed. In particular, various KPIs may be calculated on a per trajectory level or on a per trajectory segment level. In the following, such KPIs calculated on a per trajectory level or on a per trajectory segment level will also be referred to as trajectory-based KPIs.

Accordingly, the trajectory of a UE may be determined as the sequence of the zones passed by the UE, and by using a sliding time window, the trajectory may split into the trajectory segments. In the analytics system, the trajectory segments which are passed by multiple UEs during an aggregation period may be identified and KPIs may be aggregated for such trajectory segments. The aggregated KPIs for the trajectory segments may then be stored and provided to higher-level analytics components.

The trajectory-based KPIs may be useful as input to various kinds of higher-level analytics: For example, the KPIs can be aggregated for larger time periods and/or can be filtered or drilled down to any available KPI dimension, such as relevant cell(s), relevant CN node(s), relevant terminal type(s), relevant service type(s), relevant service provider (s), or the like. The results of such analytics can be presented in various ways, e.g., in a density map, in a time series graph, in a bar chart, in a distribution graph, or the like.

It is noted that in the illustrated concepts the zones, trajectories and trajectory segments are defined the radio space, in terms of the signal strength measurements with respect to the cells. However, by measuring the geographical position of some UEs, based on reported satellite positioning system data, other MPS data, or MDT, the zones, trajectories, and/or trajectory segments can also be correlated be geographical positions, and these geographical positions can be used for presentation on maps.

FIG. 1 illustrates exemplary structures of the wireless communication network. In particular, FIG. 1 shows multiple UEs 10 in a cell 101 of the wireless communication network. The cell 110 is assumed to be served by an access node 100, e.g., a gNB of the 5G NR technology or an eNB of the 4G LTE technology. The access node 100 may be regarded as being part of a RAN of the wireless communication network. Further, FIG. 1 schematically illustrates the CN 120 of the wireless communication network. In FIG. 1, the CN 120 is illustrated as including a GW (gateway) 150. The GW 150 is responsible for handling user data traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network.

As illustrated by double-headed arrows, the access node 100 may send DL (downlink) transmissions to the UEs, and the UEs may send UL (uplink) transmissions to the access node 100. The DL transmissions and UL transmissions may be used to provide various kinds of services to the UEs, e.g., a voice service, a multimedia service, or a data service. Such services may be hosted in the CN 120, e.g., by a corresponding network node. Further, such services may be hosted externally, e.g., by an AF (application function) connected to the CN 120. By way of example, FIG. 1 illustrates a service platform 180 provided outside the wireless communication network. The service platform 180 could for example connect through the Internet or some other wide area communication network to the CN 120. The service platform 180 may be based on a server or a cloud computing system and be hosted by one or more host computers. The service platform 180 may include or be associated with one or more AFs that enable interaction of the service platform 180 with the CN 120. The service platform 180 may provide one or more services to the UEs 10, corresponding to one or more applications. These services or applications may generate the user data traffic conveyed by the DL transmissions and/or the UL transmissions between the access node 100 and the respective UE 10. Accordingly, the service platform 180 may include or correspond to the above-mentioned network destination and/or network source for the user data traffic.

It is noted that the wireless communication network actually includes more access nodes for serving multiple cells in a similar way as explained for the access node 100 and the cell 101. Further, it is noted that in some scenarios the service platform 180 could at least in part also be provided in the CN 120 and/or in the AN part of the wireless communication network.

As mentioned above, RRC measurement reports may be used as a basis for determining the zones, trajectories, and trajectory segments. The RRC measurement reports may be configured by RRC configuration, e.g., as specified in 3GPP TS 36.331 V16.0.0 (2020-March). It is a typical practice in wireless communication networks to activate periodic RRC measurement reporting, so that active UEs regularly send reports on measurements of RSRP, RSRQ and/or RSSI of the serving cell and neighbor cells. These reports are typically not more frequent than one report in every 2 to 30 s, typically about every 10 s. However, even this reporting frequency may be sufficient to assist proactive radio resource management processes. In the illustrated concepts, these RRC measurement reports may be re-utilized for sub-cell level localization of the UEs in terms of the zones. As mentioned above, this localization is accomplished in radio space, i.e., the position of the UE is defined in coordinates which are based on or correspond to the signal strength values measured with respect to the cells. However, it is noted that the radio space is related to geographical space and that at least an approximate mapping between the radio space and the geographical space is possible, e.g., on the basis of correlating the zones to measurements of the geographical position of some of the UEs.

Having collected a sufficient number of signal strength measurements, these can be used to define the zones in the radio space, e.g., by clustering. If the zones are formed by clustering, they can also be referred to as "clusters". Accordingly, the zones may be formed by grouping similar signal strength measurements, typically obtained from a plurality of the UEs at different times, to a zone. As mentioned above, the zones may be defined on a sub-cell level. Typically, five to ten zones may be defined within one cell. As active UEs move in the wireless communication network and provide the signal strength measurements, each set of measured signal strengths reported by a UE at a given time may then by assigned to the closest zone. Accordingly, the UE may be regarded as being in the zone or, for a moving UE, as passing the zone. When continuing this process for a certain time, repeated reporting of the signal strength measurements may be used to identify a sequence of the zones passed by the UE, i.e., a trajectory of the UE. Due to the frequency of reporting the signal strength measurements, the trajectory is detected with a sampling interval of about 10 s. In addition, drive tests as for example described in 3GPP TS 37.320 V16.0.0 (2020-March) or other measurements of geographical position reported by a limited subset of the UEs, could be used for relating the zones, trajectories, and trajectory segments in radio space to equivalent geographical positions.

Figure 2:
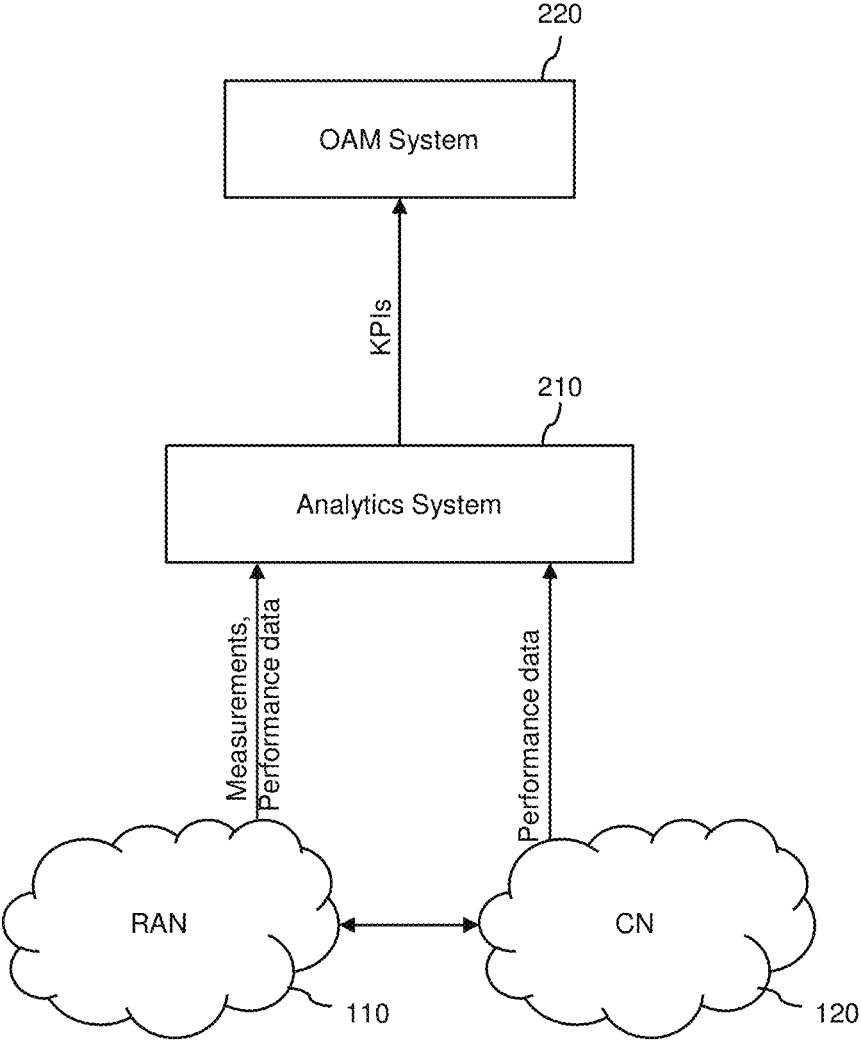
FIG. 2 schematically illustrates usage of an analytics system according to an embodiment of the invention.

FIG. 2 further illustrates an exemplary architecture for implementation of the illustrated concepts. Specifically, FIG. 2 illustrates the RAN 110 of the wireless communication network, the CN 120 of the wireless communication network, the analytics system 210, and an OAM (Operations and Maintenance) system 220. The OAM system 220 may for example support various types of subscriber and network analytics or CEM analytics. The OAM system 220 may be part of an NOC and/or of an SOC. Although FIG. 2 illustrates the analytics system 210 as a separate element, it is noted that at least a part of the analytics system 210 could be implemented by one or more nodes of the CN 120 and/or one or more nodes of the RAN 110. Further, at least a part of the functionalities of the analytics system 210 could also be implemented in the OAM system 220. Accordingly, functionalities of the analytics system 210 could be distributed in a cloud-like manner.

In the illustrated concepts, the RAN 110, and the CN 120 may be used as sources for collecting the performance data. Further, the RAN 110 is used as a source of the signal strength measurements. The analytics system 210 then processes the signal strength measurements and the performance data to provide KPIs per trajectory and/or trajectory segment to the OAM system 220. Further, the analytics system may provide the OAM system 220 with information about the zones, trajectories, and/or trajectory segments underlying the KPIs.

Figure 3:
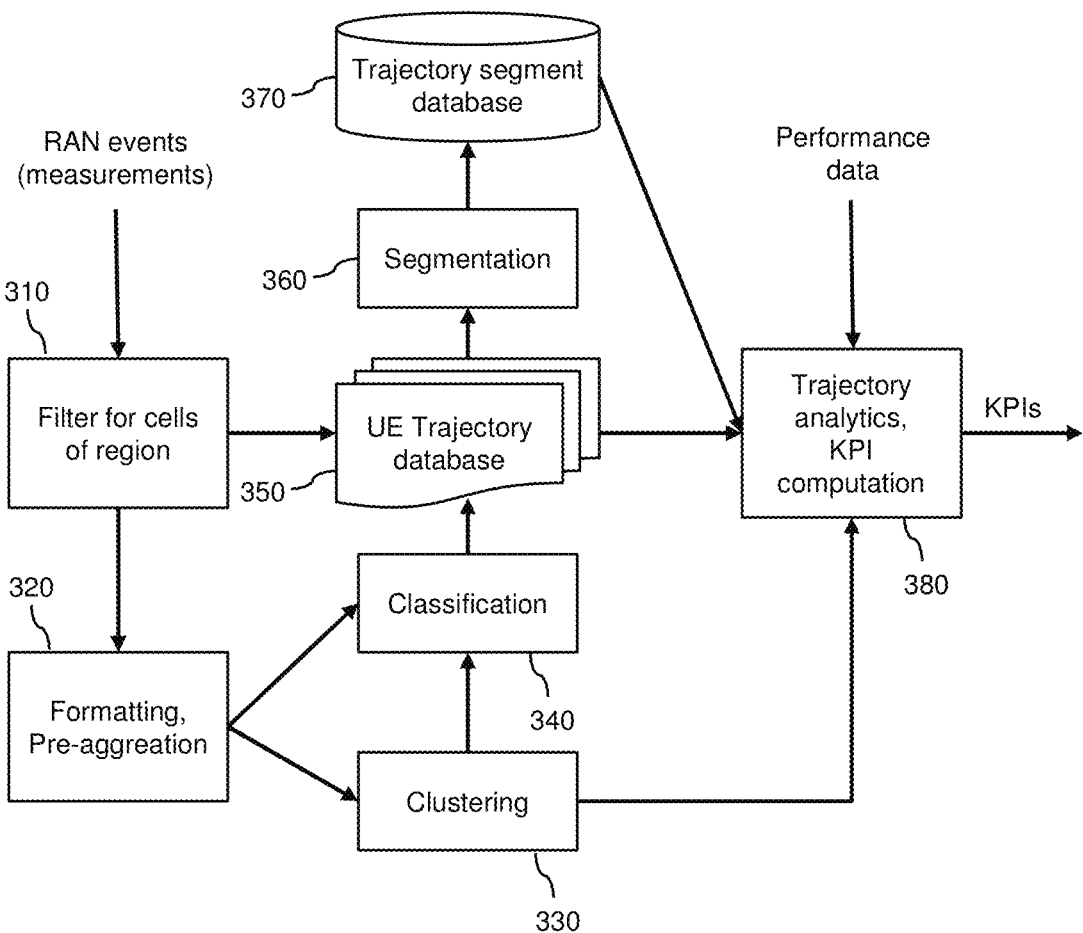
FIG. 3 schematically illustrates an example of an architecture of the analytics system according to an embodiment of the invention.

FIG. 3 schematically illustrates functionalities of the analytics system 210. As illustrated, the inputs of the analytics system 210 include report on UE-related RAN events. These reports may be received directly from the RAN 110 or indirectly through the CN 120, e.g., from a network management node of the CN 120. An filter 310 sorts the RAN events by cells and cell regions. A pre-processing stage 320 is responsible for formatting and pre-aggregation of the data from the filtered RAN events. The pre-processed data are then sent to the a clustering stage 330 and to a classification stage 340. The pre-processed data may for example include the measured signal strengths with respect to the neighboring cells in the form of a vector, using a sparse binary data format. Such sparse binary data format may for example consider that for a majority of the neighboring cells the measured signal strength is zero or close to zero. The sparse binary data format may thus for example be based on indicating values of the measured signal strength only for those cells where the value exceeds a threshold and/or indicating only the N highest values, with N being smaller than the number of cells in the cell region.

The clustering stage 330 is responsible for defining the zones in radio space, by grouping similar sets of signal strength measurements to a zone. The classification process may then classify further set of signal strength measurements by assigning them to the respectively closest zone. As a result, two databases are built: a UE trajectory database 350, and a trajectory segment database 370. The UE trajectory database 350 includes the trajectories of the UEs as detected based on the clustering and classification. The trajectories may be stored in terms of, for each trajectory, an identifier of the UE, identifiers of the zones passed by the UE, and timestamps associated with the passing of the zones. The trajectory segment database includes trajectory segments. The trajectory segments are determined by a segmentation stage 360, using the trajectories from the UE trajectory database 350 as input. Each trajectory segment in the trajectory database 370 is associated with a set of UEs which passed through the trajectory segment. The trajectories may be stored in terms of, for each trajectory segments, the identifiers of the UEs that passed the trajectory segment, identifiers of the zones forming the trajectory segment, and timestamps associated with the passing of the zones by the UEs.

An analytics stage 380 is responsible for computation of the trajectory-based KPIs and aggregation of the trajectory-based KPIs. For this purpose, inputs of the analytics stage 380 include the trajectories from the UE trajectory database 350 and/or the trajectory segments (and associated UEs) from the trajectory segment database. As additional input, the analytics stage 380 uses various performance data related to the UEs. Here, it is noted that such performance data may also be based on the UE-related RAN events used for determining the zone, trajectories and trajectory segments. Further, the performance data may be based on monitoring of user plane traffic or other network probes. The analytics calculations performed by the analytics stage 380 may be triggered by a refresh of the UE trajectory database and/or a refresh of the trajectory segment database 370. Further, the analytics calculations performed by the analytics stage 380 may be performed according to a periodic schedule or on user demand.

It is noted that in typical scenarios, the same trajectory will be passed only by a few UEs. Accordingly, the trajectories may be considered in analytics which are individual for a UE. As compared to that, the trajectory segments are shorter, so that the same trajectory segment may be passed by many UEs and can thus be used for analytics involving aggregation of performance data for multiple UEs when evaluating the KPIs. Further, it is noted that in the architecture of FIG. 3, the filter stage 310, the pre-processing stage 320, the clustering stage 330, and the classification stage 340 may be replicated for each of multiple cell regions of the wireless communication network, thereby enabling efficient de-centralized determination of the zones.

FIG. 4 illustrates an example of processes for implementing the illustrated concepts. The processes of FIG. 4 may for example be implemented by the analytics system 210.

At block 410, cell trace (CTR) events are collected from the RAN 110. For example, such CTR events may correspond to the RRC measurement reports that the UEs send for purposes of network management and mobility management, e.g., in relation to handovers. At block 420, the data from the CTR events may then be filtered and prepared for further analysis, e.g., by sorting the CTR events per UEs and serving cells. At block 430, the signal strength measurements with respect to the neighbor cells may then be used as input of a clustering process to determine the zones in radio space. Based on the zones, each set of signal strength measurements reported by a UE can be classified by assigning it to the closest zone. As a result, the trajectories of the UEs are obtained in terms of sequences of the zones passed by the respective UE. For each trajectory, also time stamps of zone transitions and information on a type of the zone transition may be stored.

At block 440, trajectory segments are determined from the trajectories, using a sliding time window. As a result, a database of trajectory segments is built. The database of trajectory segments allows for identifying the UEs and the time stamps indicating when the respective UE passed the trajectory segment.

The database of trajectory segments can then be used for filtering the performance data monitored for the UEs, so that trajectory-segment KPIs can be computed from the performance data. This may for example involve that at block 450, a table of the identified trajectory segments is created or updated. Each entry of the table corresponds to one of the trajectory segments. At block 460, the UEs that passed the same trajectory segment are identified and stored in the table to indicate, for each trajectory segment, the UEs that passed this trajectory segment in the considered sliding time window. Accordingly, each trajectory segment is then associated with a list of one or more UEs.

At block 470, the trajectory-based KPIs may be calculated, using the list of UEs associated with each trajectory segment to filter the performance data and calculate the KPI(s) for the respective trajectory segment. Here, it is noted that the performance data may be collected over an aggregation time interval which differs from the sliding time window, e.g., collected over a longer time interval than the sliding time window. The calculation of the KPIs may involve aggregating various kinds of performance data for the UEs associated with a trajectory segment and/or analysis of such performance data to discover common characteristics and events which can be also be associated with the respective trajectory segment. The trajectory-based KPIs may then be used in higher-level analytics, e.g., for coverage analytics and/or root cause analytics of performance degradations.

At block 480, the sliding time window is advanced and the processes are repeated from block 440 to identify new trajectory segments or update previously identified trajectory segments with information concerning the UEs that passed the trajectory segment.

Figure 5:
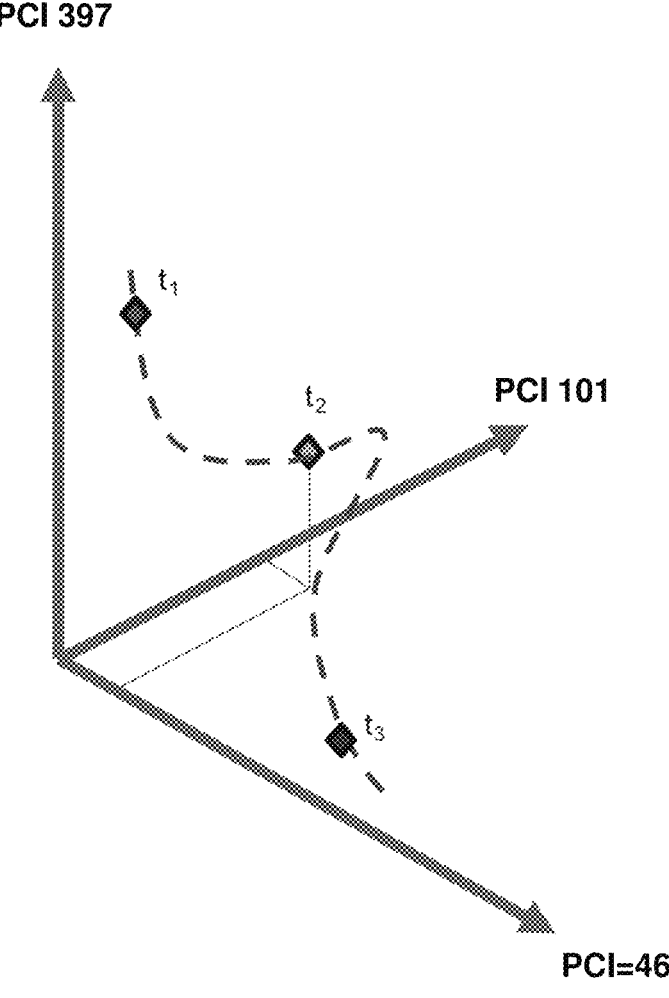
FIG. 5 illustrates an example of a movement of a UE monitored according to an embodiment of the invention.

FIG. 5 illustrates an example of a UE trajectory in radio space. For the sake of simplicity, the radio space is illustrated by three different axes, each corresponding to a different neighboring cell (in the illustrated example denoted by PCI (Physical Cell Identifier) 397, PCI 101, and PCI 46. It is however noted that the dimensionality of the radio space may be significantly larger. By way of example, the LTE technology supports 504 different PC's, and the dimensionality of the radio space for a single frequency could thus be 504. Similarly, the NR technology supports 1008 different PC's, and the dimensionality of the radio space for a single frequency could thus be 1008. The PC's are typically not strictly unique because they may be reused by other cells beyond a certain distance. However, they can be considered unique over a cell region with about 70 to 80 cells, like considered in the illustrated concepts. The position along the different axes may represent the measured RSRP, RSRQ, or RSSI for the corresponding cell. In the RRC measurements, the UE may report a maximum of eight strongest neighboring cells, but in typical scenarios only fewer neighboring cells are detected and reported, e.g., one, two, or three neighboring cells. 1, 2, or 3 neighbors. When reporting RSRP measurements, the RSRP value for a cell is offset by −140 dBm, and the reported value is in a range of [0, 97] dB. The values from cells which are out of range and not detected can be set to 0. As a result, the position in radio space defined by RSRP measurements can be represented by a 504-element measurement vector (for the LTE technology) with element values in the range [0, 97]. The result is thus a sparsely filled 504-dimensional space. Most of the measurement vectors representing the measurements would be arranged along the axes of the radio space or along hypersurfaces spanned by a relatively small number of the axes. In the example of FIG. 5, the trajectory of the UE passes a first position at time $t_1$, a second position at time $t_2$, and a third position at time $t_3$.

Figure 6:
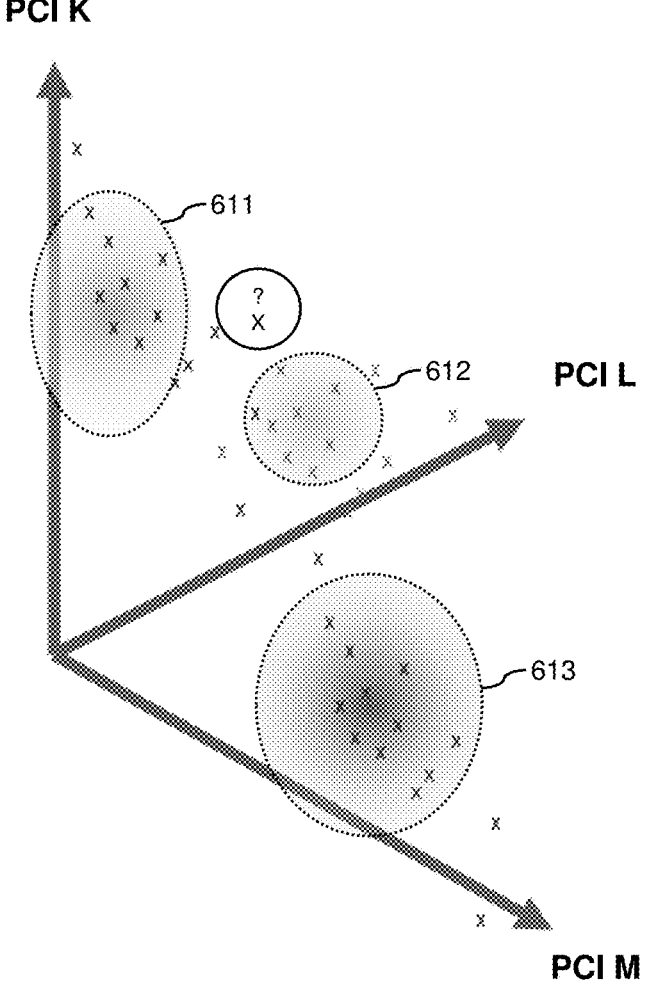
FIG. 6 illustrates an example of zones as determined according to an embodiment of the invention.

FIG. 6 shows an example for illustrating the clustering and classification of signal strength measurements. For the sake of simplicity, the radio space is again illustrated by three different axes, each corresponding to a different neighboring cell (in the illustrated example denoted by PCI K, PCI L, and PCI M. It is however noted that the dimensionality of the radio space may be significantly larger, e.g., 504 in the LTE technology or 1008 in the NR technology.

In the illustrated example, a finite number of zones 611, 612, 613 in radio space are defined based on a teaching set of signal strength measurements. In FIG. 6, these learned zones 611, 612, 613 are marked by dotted circles. Then further signal strength measurements are classified by assigning them to their closest zone 611, 612, 613. By way of example, in FIG. 6 a newly reported set of signal strength measurements is marked by "?" and a solid circle. This set of signal strength measurements could for example be classified by assigning it to the zone 612.

Various clustering techniques can be used for defining the zones 611, 612, 613, e.g. a self-organizing map technique, an affinity propagation technique, or a K medoid technique. The clustering parameters can be set such that 5-10 zones per cell are obtained. Here, it is noted that if the number of the zones is too high, then a natural randomness of the signal strength measurements may adversely affect the classification. On the other hand. if the number of the zones is too low, it may longer be possible to achieve sub-cell level resolution. The selection of an adequate number of zones per cell and of the corresponding clustering parameters may depend on the local radio deployment, e.g., may differ between macro- and micro-cell deployments. Further, the clustering process may be configured to provide a zone vector for each zone. The zone vector may for example correspond to a center of the measurement vectors defining the zone. The zone vector may be used as a reference when classifying newly received signal strength measurements. Further, the zone vector may be used as an indicator of the radio space position of the signal strength measurements associated with the zone.

Figure 7:
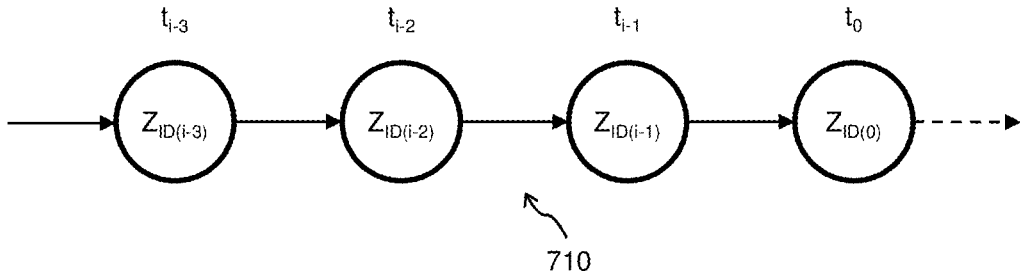
FIG. 7 schematically illustrates a UE trajectory as determined according to an embodiment of the invention FIG. 8 schematically illustrates determination of trajectory segments according to an embodiment of the invention

FIG. 7 schematically illustrates an example of a UE trajectory 710. As illustrated, the UE trajectory 710 is defined by a sequence of the zones which are passed by the UE. In the example of FIG. 7, these zones are denoted by zone identifiers $z_{ID(i-3)}$, $z_{ID(i-2)}$, $z_{ID(i-1)}$, $z_{ID(0)}$, which correspond to the zones passed at times $t_{i-3}$, $t_{i-2}$, $t_{i-1}$, $t_0$, respectively. The time $t_0$ may correspond to the latest signal strength measurements and be regarded as representing the current status of the UE. When assuming periodic reporting of signal strength measurements is used, the time interval between the times $t_{i-3}$, $t_{i-2}$, $t_{i-1}$, $t_0$ may be determined by the reporting periodicity, e.g., as set by RRC configuration. The reporting periodicity may be adaptively set by the network according to the local deployment and UE mobility behavior, with the aim of achieving a sufficient number of samples to detect movements of the UE, while at the same time avoiding excessive data load in the network. This time interval may for example be about 10 s, which was found to provide good results in a macro environment with UEs in fast moving vehicles.

The UE trajectory 710 is represented by the sequence of the zone identifiers and the timestamps of representing the time of passing the respective zone. In some scenarios, other types of RRC events than periodic signal strength measurements can also be considered in the UE trajectory 710. Such events may for example include handover trigger events, handovers, or radio link failures. In such cases, the transitions between the zones on the representation of the UE trajectory can be categorized accordingly. For example, a transition from one zone to another can be categorized as being related to a handover or as being related to a connection loss by a radio link failure. The transitions between the zones along the UE trajectory 710 can thus be marked to indicate different types of transition. The indicated transition types may then be used in later analysis processes, e.g., in root cause analysis processes. The transition types may for example distinguish between two or more of: a transition related to movement of the UE, a transition related to a handover of the UE, a transition related to a radio link failure, a transition related to connection establishment, and/or a transition related to connection re-establishment. In the case of transitions related to a handover, the transition types may distinguish between a transition related to an intra-frequency handover, a transition related to an inter-frequency handover, and/or a transition related to an inter-radio access technology handover UE trajectories as explained in connection with FIG. 7 may be stored in the above-mentioned UE trajectory database 350. In the UE trajectory database, the UE trajectories may be indexed by UE identifiers and represented by the time stamped zone identifier sequences, optionally marked to indicate the transition type. As a result, the UE trajectory database may be stored in a compact manner, which is easily searchable on the basis of UE identifiers, zone identifiers, and/or or time periods.

Figure 8:
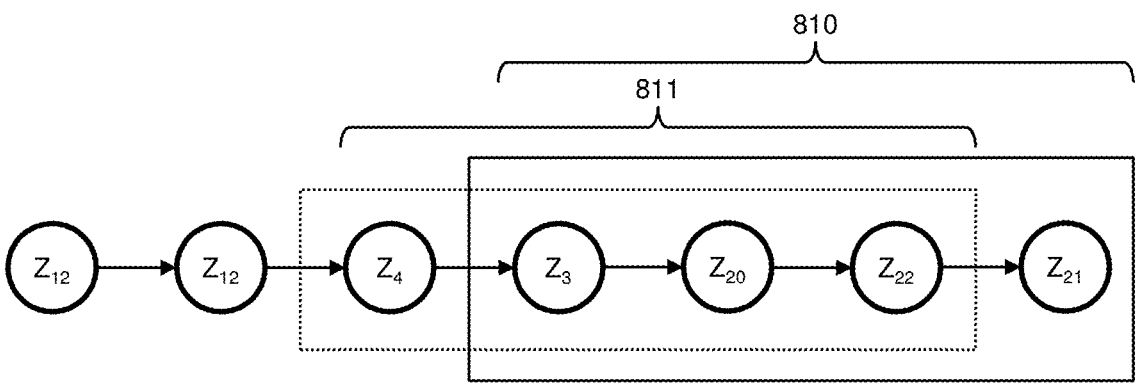

FIG. 8 further illustrates the determination of trajectory segments 810, 811 from the UE trajectories. For this purpose, the UE trajectories, e.g., determined as explained in connection with FIG. 7, are split on the basis of a sliding time window which advances in real time as the UE trajectory is evolving. In FIG. 8, the current position of the sliding time window is illustrated by a solid box, while the previous position of the sliding time window is illustrated by a dotted box. The width of the sliding time window can for example be 1 m, which was found to be sufficiently long to capture typical mobility behavior of UEs. If the above-mentioned reporting periodicity is 10 s, then the typical length of a trajectory segment would thus correspond to six zones. The trajectory segments would thus each be a six-element sequence of zone identifiers and transition types. In theory, a huge number of such trajectory sequences may occur in a wireless communication network. In practice, it is however feasible to consider only a subset of the most frequently occurring trajectory segments, e.g., the 10000 most frequent trajectory segments per cell region. The trajectory segment database 370 may represent such segments in the form of a table as illustrated in FIG. 8. Upon arrival of a new report of signal strength measurements from a UE, the reported measurement vector is classified by assigning it to one of the zones, and the identifier of this zone is appended to the corresponding UE trajectory, in the illustrated example zone identifier $z_{21}$. The sliding time window also slides to the current end of the UE trajectory and thereby selects the zone identifier sequence corresponding to the width of the sliding time window, e.g., corresponding to the last minute. The resulting trajectory segment is searched in the existing records of the trajectory segment database 370. If there is no existing record for trajectory segment, a new record is created and the identifier of the UE is added to the record. If an existing record for the trajectory segment is found, a counter associated with this record is incremented and the identifier of the UE is added to the record. In each case, the record associated with the trajectory segment may also be supplemented by a timestamp indicating when the UE passed the trajectory segment. The example of FIG. 8, the trajectory segment database indicates that the most recently passed trajectory segment corresponds to zones $z_3$, $z_{20}$, $z_9$, $z_{22}$, and $z_2$, and was passed by $UE_7$ and $UE_{13}$. A further trajectory segment corresponds to zones $z_4$, $z_3$, $z_{20}$, $z_9$, and $z_{22}$, and was passed by $UE_7$ and $UE_{13}$. A further trajectory segment corresponds to zones $z_{12}$, $z_4$, $z_3$, $z_{20}$, and $z_9$, and was passed by $UE_7$ and $UE_{19}$. A still further trajectory segment corresponds to zones $z_{12}$, $z_{12}$, $z_4$, $z_3$, and $z_{20}$, and was passed by $UE_7$ and $UE_{19}$.

The trajectory-based KPIs may be continuously aggregated and calculated for the trajectory segments. This aggregation may be accomplished over aggregation time periods, e.g., of. 10 m, 1 h, 1 day, depending on the intended type of higher level analytics The calculation method may depend on the type of the KPI and/or the considered performance data. In some cases the KPI may be defined in terms of a count of events, e.g., a count of successful connection setups or a count of connection drops. In other cases, the KPI may be based on a cumulative sum, e.g., like amount of downloaded data over the trajectory segment. In some cases, the KPI may be defined in terms of an average value, e.g., like average packet loss ratio, average data throughput, average video service quality. In each case, special KPI values can be obtained for individual trajectory segments or entire UE trajectories.

The trajectory-based KPIs may be used as a basis for various types of higher level analytics. For example, they may be used to identify service quality degradation for moving subscribers in connection to certain trajectory segments and/or to identify problematic trajectory segments in the network. Further, trajectory-based KPIs, e.g., service quality related KPIs, packet level KPIs, or radio related KPIs, may be compared between different individual UEs which passed the same trajectory segments. Further, changes of trajectory-based KPIs, which are related to moving subscribers, may be detected in different parts of the network, e.g., in order to record a daily KPI profile along different highways. Further, the trajectory-based KPIs may be used to identify service-related or other degradations for a certain trajectory segment by comparing recently computed values of a trajectory-based KPI with previously computed historical values. Further, it may be possible to identify sequence of incidents in geographical map for an individual UE or for a group of multiple UEs.

Figure 9A:
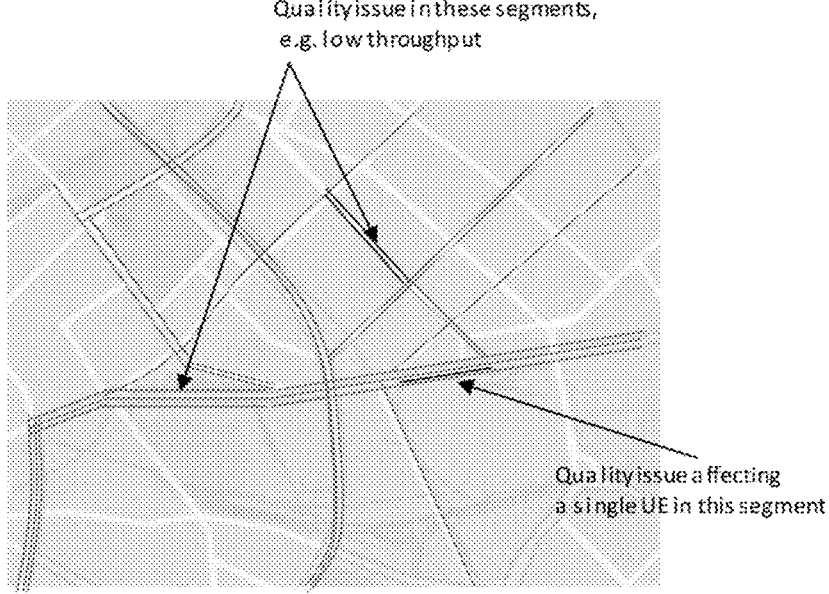
FIG. 9A shows an example of correlating trajectory segments and related KPIs to a geographical map.
Figure 9B:
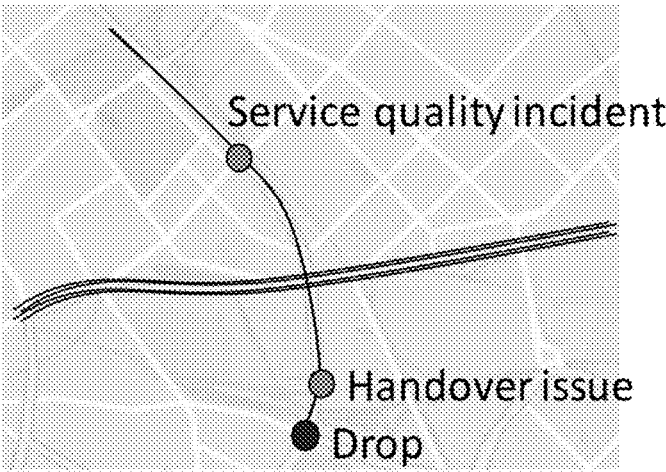
FIG. 9B shows an example of illustrating incidents monitored for an individual UE on a geographical map.

As mentioned above, in some cases the zones, trajectories, and/or trajectory segments can be mapped to corresponding geographical positions. In such cases, the calculated trajectory based KPIs or information related thereto can be represented on a geographical map. In this way, it may be possible to intuitively identify problematic areas. FIGS. 9A and 9B illustrate corresponding examples. In the example of FIG. 9A, trajectory segments with KPIs indicating quality issues are identified by highlighting corresponding geographical areas on a geographical map. In the example of FIG. 9B, different incidents related to the trajectory of a single UE are identified by highlighting corresponding geographical positions on a geographical map.

Figure 10:
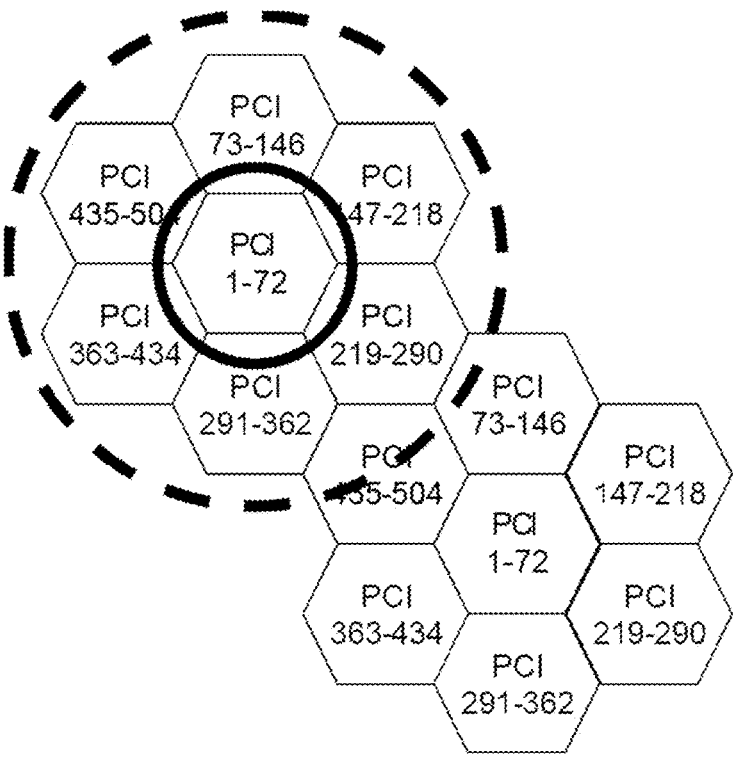
FIG. 10 illustrates an example of organizing determination of zones and trajectories in one or more cell regions.

FIG. 10 schematically illustrates a cell region to which the illustrated concepts may be applied. As mentioned above, the cell region may include about 70 to 80 cells. Each of the cell is identified by a PCI which can be assumed to be unique within the cell region. Although the illustrated concepts can also be applied to other sizes of cell regions, the size of 70 to 80 cells was found to be well-suited to typical RRC measurement reporting configurations, where neighboring cells are identified by their PC's. When assuming that the number of different PC's is limited to 504 like in the case of the LTE technology, and there is a 1:7 reuse pattern of PC's, most likely there will be ambiguity of PC's within the cell region of 70 to 80 cell size. In the case of the NR technology, which supports 1008 different PC's, a correspondingly larger cell region, e.g., of 140 to 160 cells, may be considered. In FIG. 10, a region with low risk of ambiguity of PC's is illustrated by a solid circle, and a region covered by all the available PC's is illustrated by a dashed circle.

The cell regions may be considered by replicating the filter stage 310, the pre-processing stage 320, the clustering stage 340, and the classification stage 350 for each cell region. To avoid ambiguities when further processing the data, the zone identifiers may be supplemented by region identifiers corresponding to the cell regions. These parts of the processing may thus be efficiently implemented in an edge cloud of the wireless communication network, e.g., within the RAN 110, at the sites of the respective cell regions. In this case, efficiency of data processing can be increased by reducing the amount of data that needs to be sent to the CN 120. It can thus be avoided that an excessive amount of data related to the reported signal strength measurements needs to be reported to and through the CN 120.

FIG. 10 may also be used to illustrate how the illustrated concepts can be scaled to be applied to the entire wireless communication network. Due to the PCI reuse in LTE or NR networks, it may be useful to separate a part of the data processing according to the cell regions, where PCIs can be assumed as unambiguous. Accordingly, the overall coverage area of the wireless communication network can be divided into the cell regions of about 70 to 80 neighboring cells, so that in resulting cell region, a PCI uniquely belongs to one cell. Then such cell regions may be further divided by clustering to zones. Then the cell regions may be stitched together to extend the monitoring algorithm to a network wide scale.

Figure 11:
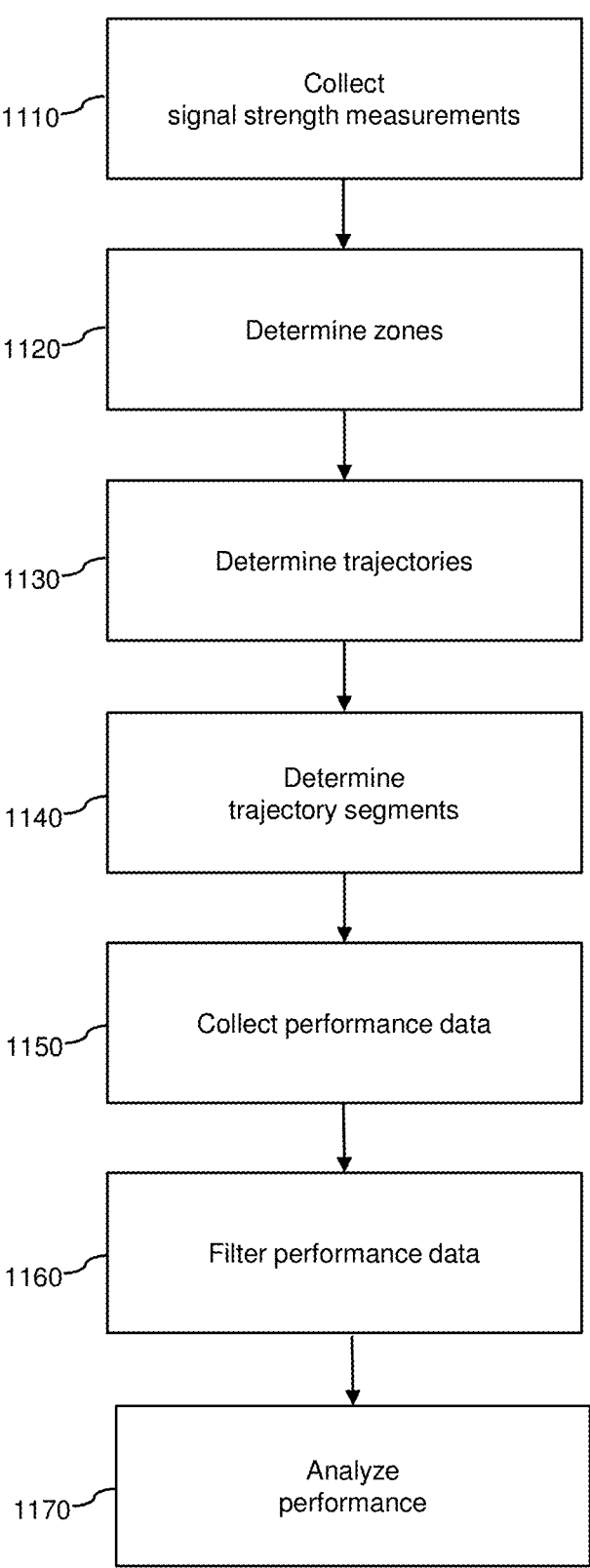
FIG. 11 shows a flowchart for illustrating a method according to an embodiment of the invention.

FIG. 11 shows a flowchart for illustrating a method of controlling user data traffic in a wireless communication network. The method of FIG. 11 may be utilized for implementing the illustrated concepts in a node of the wireless communication network. The node may implement an analytics system or at least a part of functionalities of an analytics system, such as the above-mentioned analytics system 210.

If a processor-based implementation of the node is used, at least some of the steps of the method of FIG. 11 may be performed and/or controlled by one or more processors of the node. Such node may also include a memory storing program code for implementing at least some of the below described functionalities or steps of the method of FIG. 11.

At step 1110, signal strength measurements are collected for each of a plurality of wireless devices. The signal strength measurements are performed by the wireless device with respect to a plurality of cells of the wireless communication network, e.g., with respect to cells which are neighboring to a serving cell of the wireless device. The signal strength measurements may be collected from RRC measurement reports. At least some of the measurement reports may relate to handover events.

At step 1120, a plurality of zones of the wireless communication network is determined. This is accomplished based on the signal strength measurements collected at step 1110. Each zone indicates a position of the wireless device with respect to the cells when performing a respective one of the signal strength measurements. The zones may be determined based on clustering of the signal strength measurements, e.g., as explained in connection with FIG. 6. The zones may indicate the positions of the wireless device with a finer granularity than the coverage areas of the cells. For example, about 5 to 10 zones may be included in the coverage area of one cell. Further, once zones have been defined based on clustering of a part of the signal strength measurements, a further part of the signal strength measurements may be classified by assigning them to the zones.

In some scenarios, for at least for a subset of the wireless devices, also measurements of geographical position of the wireless device may be collected. In this case, the determined zones may be correlated with the measurements of geographical position to associate one or more of the zones with a corresponding geographical position or geographical area.

At step 1130, for each of the wireless devices a respective trajectory is determined from a sequence of the zones passed by the wireless device. For example, the trajectories may be determined as explained in connection with FIG. 7.

In some scenarios, for one or more of the trajectories transitions between zones of the trajectory may be categorized according to transition types. These transition types may include one or more of: a transition related to movement of the wireless device, a transition related to a handover of the wireless device, a transition related to a radio link failure, a transition related to connection establishment, and a transition related to connection re-establishment. The transition types related to a handover may include one or more of: a transition related to an intra-frequency handover, a transition related to an inter-frequency handover, and/or a transition related to an inter-radio access technology handover.

At step 1140, for each of the trajectories, one or more trajectory segments corresponding to a sliding time window are be determined. For example, the trajectory segments may be determined as explained in connection with FIG. 8.

Also, for one or more of the trajectories segments, transitions between zones of the trajectory segment may be categorized according to transition types. These transition types may include one or more of: a transition related to movement of the wireless device, a transition related to a handover of the wireless device, a transition related to a radio link failure, a transition related to connection establishment, and a transition related to connection re-establishment. The transition types related to a handover may include one or more of: a transition related to an intra-frequency handover, a transition related to an inter-frequency handover, and/or a transition related to an inter-radio access technology handover.

At step 1150, performance data related to the wireless devices are collected. The performance data may be based on data provided by one or more nodes of a RAN part of the wireless communication network and/or on data provided by one or more nodes of a CN network part of the wireless communication network. The performance data may be based on monitoring of user data traffic, e.g., on a packet level or on a service level. In addition or as an alternative, the performance data may be based on monitoring radio characteristics or radio conditions.

At step 1160, the performance data are filtered based on the trajectories determined at step 1140 and/or based on the trajectory segments optionally determined at step 1140. The filtering may involve selecting a subset of the performance data which corresponds to a certain trajectory or trajectory segment, e.g., by considering identifiers of the wireless devices that passed the trajectory or trajectory segment, and/or by considering time stamps associated with the passing of the trajectory or trajectory segment.

At step 1170, performance may be analyzed based on the filtered performance data. For example, this may involve using the filtered performance data to compute one or more performance indicators per trajectory, as determined at step 1130, or per trajectory segment, as optionally determined at step 1140.

The one or more performance indicators may represent a number of successful connection establishments, a number of connection losses, a volume of downloaded data, a volume of uploaded data, a packet loss ratio, a data throughput, and/or a service quality. In some scenarios, the one or more performance indicators may be calculated individually for each of multiple wireless devices. In some scenarios, the individually calculated performance indicators may be aggregated for a group of the wireless devices. In some scenarios, the performance indicators may be aggregated over an aggregation time interval.

Further, step 1170 may involve comparing the individually calculated performance indicators of two or more of the wireless devices that passed the same trajectory or trajectory segment. Further, step 1170 may involve identifying, based on the performance indicators, one or more critical trajectories and/or critical trajectory segments. Further, step 1170 may involve, based on a comparison of the one or more performance indicators as calculated at a first point of time to the one or more performance indicators as calculated at a second point of time, identifying a degradation for a trajectory and/or trajectory segment. Further, step 1170 may involve, based on a comparison of the one or more performance indicators calculated for a trajectory of an individual wireless device, identifying one or more incidents in relation to movement of the wireless device along the trajectory.

Figure 12:
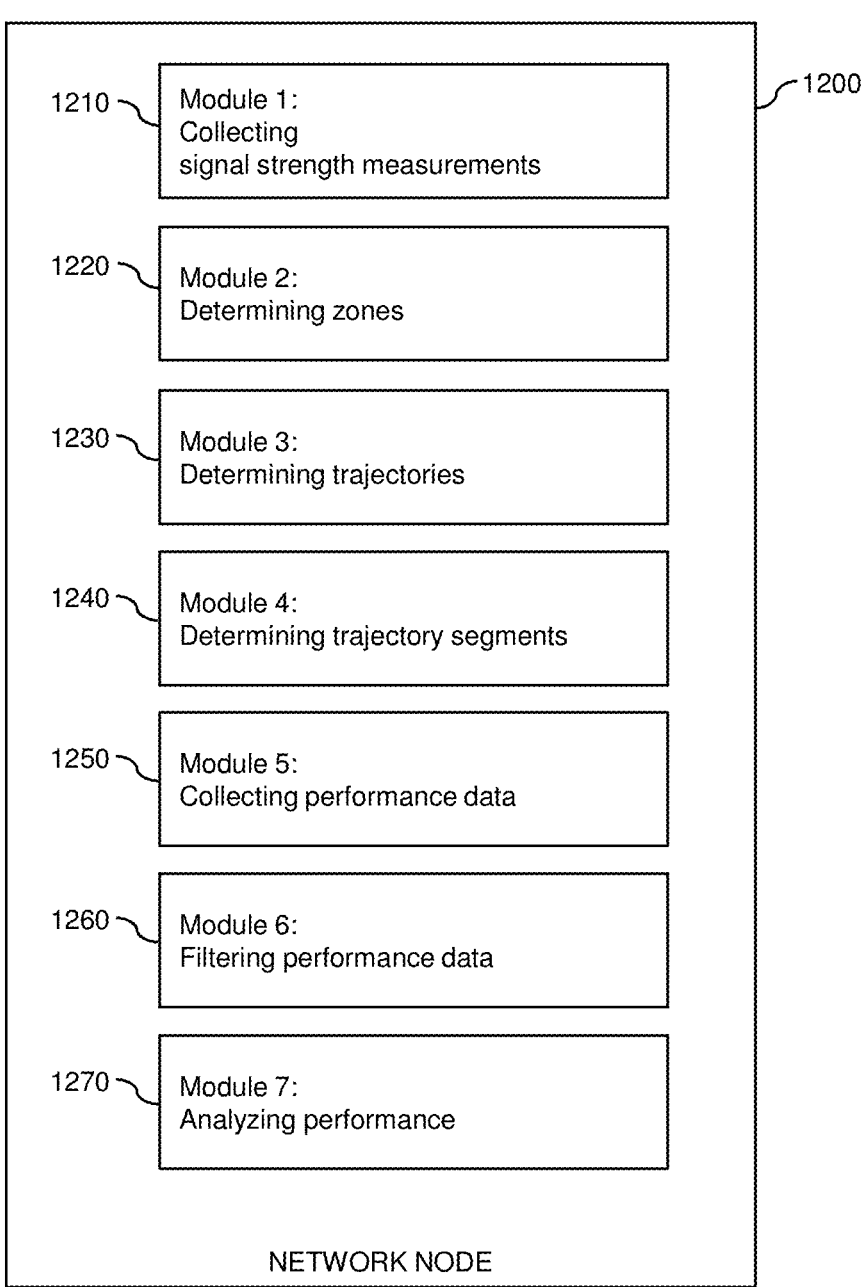
FIG. 12 shows an exemplary block diagram for illustrating functionalities of a network node implementing functionalities corresponding to the method of FIG. 11.

FIG. 12 shows a block diagram for illustrating functionalities of a network node 1200 which operates according to the method of FIG. 11. The network node 1200 may for example implement an analytics system or at least a part of functionalities of an analytics system, such as the above-mentioned analytics system 210. As illustrated, the network node 1200 may be provided with a module 1210 configured to collect signal strength measurements, such as explained in connection with step 1110. Further, the network node 1200 may be provided with a module 1220 configured to determine zones of the wireless communication network, such as explained in connection with step 1120. Further, the network node 1200 may be provided with a module 1230 configured to determine trajectories, such as explained in connection with step 1130. Further, the network node 1200 may optionally be provided with a module 1240 configured to determine trajectory segments, such as explained in connection with step 1140. Further, the network node 1200 may be provided with a module 1250 configured to collect performance data, such as explained in connection with step 1150. Further, the network node 1200 may be provided with a module 1260 configured to filter the performance data, such as explained in connection with step 1160. Further, the network node 1200 may optionally be provided with a module 1270 configured to analyze performance, such as explained in connection with step 1270.

It is noted that the network node 1200 may include further modules for implementing other functionalities, such as known functionalities of an analytics system. Further, it is noted that the modules of the network node 1200 do not necessarily represent a hardware structure of the network node 1200, but may also correspond to functional elements, e.g., implemented by hardware, software, or a combination thereof.

Figure 13:
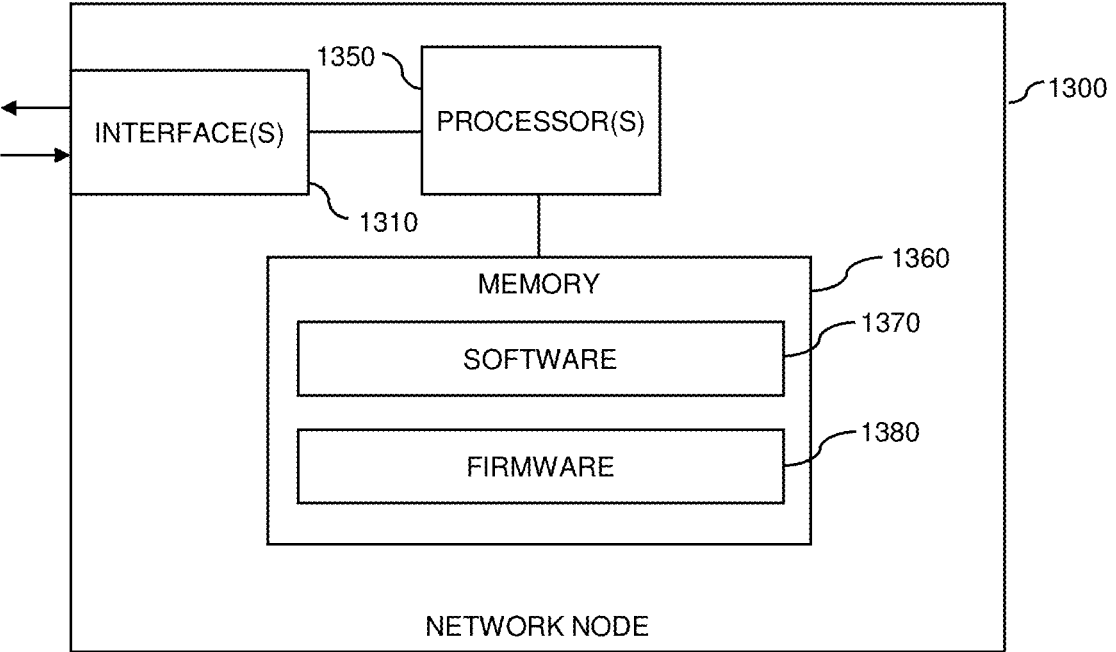
FIG. 13 schematically illustrates structures of a node according to an embodiment of the invention.

FIG. 13 illustrates a processor-based implementation of a network node 1300 which may be used for implementing the above-described concepts. For example, the structures as illustrated in FIG. 13 may be used for implementing any of the analytics system implementing the illustrated concepts, like the analytics system 210. In some scenarios, also a system of multiple network nodes 1300 with structures as illustrated in FIG. 9 may be used implementing the above-described concepts.

As illustrated, the network node 1300 includes one or more interfaces 1310. These interfaces 1310 may for example be used for enabling communication with one or more other nodes.

Further, the network node 1300 may include one or more processors 1350 coupled to the interface(s) 1310 and a memory 1360 coupled to the processor(s) 1350. By way of example, the interface(s) 1310, the processor(s) 1350, and the memory 1360 could be coupled by one or more internal bus systems of the network node 1300. The memory 1360 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1360 may include software 1370 and/or firmware 1380. The memory 1360 may include suitably configured program code to be executed by the processor(s) 1350 so as to implement the above-described functionalities of a network node, such as explained in connection with FIGS. 11 and 12.

It is to be understood that the structures as illustrated in FIG. 13 are merely schematic and that the network node 1300 may actually include further components which, for the sake of clarity, have not been illustrated, e.g., further interfaces or processors. Also, it is to be understood that the memory 1360 may include further program code for implementing known functionalities of a network node, e.g., known functionalities of an analytics system for a 3GPP network. According to some embodiments, also a computer program may be provided for implementing functionalities of the network node 1300, e.g., in the form of a physical medium storing the program code and/or other data to be stored in the memory 1360 or by making the program code available for download or by streaming.

As can be seen, the concepts as described above may be used for efficiently monitoring performance in a wireless communication network, in particular for moving wireless devices. The concepts may enable KPI analysis for subscriber and network analytics with sub-cell localization detail. Further, the sub-cell analysis may be applied to trajectory segments where KPIs are aggregated for multiple UEs passing the same trajectory segment during an aggregation time interval. Further, the concepts provide high efficiency because only those trajectory segments may need to be considered in evaluation which have a statistically sufficient amount of collected data. Accordingly, processing and storage capacity can be utilized in an efficient manner. Further, the concepts may be applied to UE trajectories within cells and across cells, so that the calculated KPIs provide information on sub-cell level locations and on typical motion patterns of UEs. Further, the sub-cell level analytics do not require collecting or computing geographical coordinates of subscribers, which is beneficial in view of subscriber security and integrity. The concepts may utilize existing RRC measurement reports and it do not require that UEs activate satellite positioning or other MPS functions to report their location to the network. As a result, the concepts may enable high power efficiency at the UE side and may avoid excessive traffic and processing overhead in the network. Correlation of the obtained trajectory-based KPIs with geographical positions can be achieved by obtaining measurements of geographical positions from only a limited subset of the considered UEs.

It is to be understood that the examples and embodiments as explained above are merely illustrative and susceptible to various modifications. For example, the illustrated concepts may be applied in connection with various wireless communication network technologies, without limitation to the NR technology.

Moreover, it is to be understood that the above concepts may be implemented by using correspondingly designed software to be executed by one or more processors of an existing device or apparatus, or by using dedicated device hardware. Further, it should be noted that the illustrated nodes may each be implemented as a single device or as a system of multiple interacting devices or modules, e.g., as a cloud system.

The invention claimed is:

1. A method of monitoring a wireless communication network, the method comprising:

for each of a plurality of wireless devices, collecting signal strength measurements performed by a wireless device with respect to a plurality of cells of the wireless communication network;

determining a plurality of zones of the wireless communication network based on the signal strength measurements and without indications of geographical position where the signal strength measurements were performed by the wireless device, each zone indicating a position of the wireless device with respect to the cells when performing a respective one of the signal strength measurements;

for each of the wireless devices, determining a respective trajectory from a sequence of the zones passed by the wireless device;

collecting performance data related to the wireless devices; and filtering the performance data based on the trajectories.

2. The method according to claim 1, further comprising:

for each of the trajectories, determining one or more trajectory segments corresponding to a sliding time window; and filtering the performance data based on the trajectory segments.

3. The method according to claim 1, wherein determining the zones is based on clustering of the signal strength measurements.

4. The method according to claim 1, wherein the zones indicate the position of the wireless device with a finer granularity than the coverage areas of the cells.

5. The method according to claim 1, at least for a subset of the wireless devices, collecting measurements of geographical position of the wireless device; and correlating the determined zones with the measurements of geographical position to associate one or more of the zones with a corresponding geographical position.

6. The method according to claim 1, comprising:

for one or more of the trajectories or trajectory segments, categorizing transitions between zones according to transition types.

7. The method according to claim 6, wherein the transition types comprise: a transition related to movement of the wireless device, a transition related to a handover of the wireless device, a transition related to a radio link failure, a transition related to connection establishment, and/or a transition related to connection re-establishment.

8. The method according to claim 7, wherein the transition types comprise a transition related to an intra-frequency handover, a transition related to an inter-frequency handover, and/or a transition related to an inter-radio access technology handover.

9. The method according to claim 1, wherein the signal strength measurements are collected from Radio Resource Control, RRC, measurement reports.

10. The method according to claim 9, wherein at least some of the measurement reports relate to handover events.

11. The method according to claim 1, wherein the performance data are based on data provided by one or more nodes of a radio access network part of the wireless communication network and/or on data provided by one or more nodes of a core network part of the wireless communication network.

12. The method according to claim 1, comprising:

based on the filtered performance data, computing one or more performance indicators per trajectory or trajectory segment.

13. The method according to claim 12, wherein the one or more performance indicators represent a number of successful connection establishments, a number of connection losses, a volume of downloaded data, a volume of uploaded data, a packet loss ratio, a data throughput, and/or a service quality.

14. The method according to claim 12, comprising:

calculating the one or more performance indicators individually for each of multiple wireless devices.

15. The method according to claim 14, comprising:

aggregating the individually calculated performance indicators for a group of the wireless devices.

16. The method according to claim 14, comprising:

comparing the individually calculated performance indicators of two or more of the wireless devices that passed the same trajectory or trajectory segment.

17. The method according to claim 12, comprising:

aggregating the one or more performance indicators over an aggregation time interval; and based on the performance indicators, identifying one or more critical trajectories and/or critical trajectory segments.

18. The method according to claim 12, comprising:

based on a comparison of the one or more performance indicators as calculated at a first point of time to the one or more performance indicators as calculated at a second point of time, identifying a degradation for a trajectory and/or trajectory segment.

19. The method according to claim 12, comprising:

based on a comparison of the one or more performance indicators calculated for a trajectory of an individual wireless device, identifying one or more incidents in relation to movement of the wireless device along the trajectory.

20. A node for a wireless communication network, the node being configured to:

for each of a plurality of wireless devices collect signal strength measurements performed by a wireless device with respect to a plurality of cells of the wireless communication network;

determine a plurality of zones of the wireless communication network based on the signal strength measurements and without indications of geographical position where the signal strength measurements were performed by the wireless device, each zone indicating a position of the wireless device with respect to the cells when performing a respective one of the signal strength measurements;

for each the wireless devices, determine a respective trajectory from a sequence of the zones passed by the wireless device;

collect performance data related to the wireless devices; and filter the performance data based on the trajectories.

* * * * *